United States Patent [19]

Pettibone et al.

[11] 4,376,901
[45] Mar. 15, 1983

[54] MAGNETOCUMULATIVE GENERATOR

[75] Inventors: Joseph S. Pettibone; Paul C. Wheeler, both of Livermore, Calif.

[73] Assignee: The United States of America as represented by the United States Department of Energy, Washington, D.C.

[21] Appl. No.: 271,060

[22] Filed: Jun. 8, 1981

[51] Int. Cl.$^3$ .............................................. H02K 45/00
[52] U.S. Cl. ........................................................... 310/10
[58] Field of Search .................................. 310/10; 89/8

[56] References Cited

U.S. PATENT DOCUMENTS

| | | | |
|---|---|---|---|
| 3,356,869 | 12/1967 | Hilton et al. | 310/10 |
| 3,478,231 | 11/1969 | Knoepfel et al. | 310/10 |
| 3,484,622 | 12/1969 | Conger et al. | 310/10 |
| 4,121,123 | 10/1978 | Crolins | 310/10 |

Primary Examiner—Donovan F. Duggan
Attorney, Agent, or Firm—Clifton E. Clouse, Jr.; Roger S. Gaither; Richard G. Besha

[57] ABSTRACT

An improved magnetocumulative generator is described that is useful for producing magnetic fields of very high energy content over large spatial volumes. The polar directed pleated magnetocumulative generator has a housing (100, 101, 102, 103, 104, 105) providing a housing chamber (106) with an electrically conducting surface. The chamber (106) forms a coaxial system having a small radius portion and a large radius portion. When a magnetic field is injected into the chamber (106), from an external source, most of the magnetic flux associated therewith positions itself in the small radius portion. The propagation of an explosive detonation through high-explosive layers (107, 108) disposed adjacent to the housing causes a phased closure of the chamber (106) which sweeps most of the magnetic flux into the large radius portion of the coaxial system. The energy content of the magnetic field is greatly increased by flux stretching as well as by flux compression. The energy enhanced magnetic field is utilized within the housing chamber itself.

10 Claims, 12 Drawing Figures

MAGNETOCUMULATIVE GENERATOR

The U.S. Government has rights in this invention pursuant to Contract No. W-7405-ENG-48 between the U.S. Department of Energy and the University of California for the performance of energy research and development work at the Lawrence Livermore National Laboratory.

BACKGROUND OF THE INVENTION

The invention described herein relates generally to apparatus and method involving magnetocumulative generators, i.e., to apparatus and method in which work is done on magnetic fields by the compression of the magnetic flux thereof by moving conductors.

At the outset, some fundamental principles of the physics underlying magnetocumulative generators will be given. A magnetic field may be completely characterized by a vector function B which is variously called the magnetic induction, the magnetic flux density, the magnetic field strength, or in recent years simply the magnetic field. Because of the non-existence of magnetic charge, the divergence of B is everywhere zero. The most familiar unit of B is the gauss. The intensity of the earth's magnetic field, near the surface of the earth, is of the order of one-half gauss. Magnetic fields of up to about 80,000 gauss can be supplied by commercially available superconducting magnets. However, magnetic fields greater than about 100,000 gauss are difficult to achieve. Magnetic field B should not be confused with the vector function H, the unit of which is the oersted. The vector function H is equal to B minus $4\pi M$, where M is the magnetic moment density. H does not necessarily have zero divergence. Any magnetic field possesses magnetic flux. The quantity of magnetic flux passing through or linking a closed curve is given by the surface integral of B over any surface which has the closed curve for its boundary. Magnetic flux is thus measured in units of B times area, such as gauss cm$^2$. Because the divergence of B equals zero, as much flux enters any volume as leaves it. It is frequently helpful to conceptualize tubes of flux. A flux tube is bounded by a surface which is everywhere tangent to B. Therefore no flux passes through the surface of a flux tube. Consequently a flux tube can be thought of as containing a definite amount of flux. Both the magnetic energy density and the magnetic hydrostatic pressure at points within a magnetic field are proportional to B$^2$.

Known magnetocumulative generators consist of a housing defining an internal housing chamber which may be partially open. The surface of the chamber is electrically conducting. The chamber is filled with magnetic flux so that the flux is surrounded by electrical conductor on all sides except those perpendicular to the direction of the magnetic field. The magnetic flux is usually created by means external to the housing chamber which employ a high voltage and current electrical source, such as a capacitor bank. The flux is often introduced into the housing chamber via a slot in the conducting surface of the chamber. When the quantity of magnetic flux, or the magnitude of the magnetic field, reaches a prescribed value the slot is closed and external forces are applied to the housing which cause a collapse of the conducting surface of the housing chamber. This collapse compresses the magnetic flux so that the value of the magnetic field becomes greatly increased. In most applications the enhanced magnetic field is utilized within the housing chamber itself. As a specific example of a known magnetocumulative generator, a perspective cutaway view of a typical early model discussed by A.D. Sakharov, Usp. Fiz. Nauk 88, 725 (1966), is shown in FIG. 1. It is of a type which has been in use at least since 1952, and consists of hollow metallic cylinder 10 within which a longitudinal magnetic field is established by means of the discharge of capacitor bank 12 through solenoid winding 14 which surrounds the cylinder. A narrow slot 16 cut into the cylinder insures rapid penetration of the field. At about the time when the current in the solenoid winding is at a maximum, a converging cylindrical shock wave is produced in the metallic cylinder by means of the detonation of explosive charge 18. The explosive charge is set off either by an electric multiple-point initiation system or by detonation lenses. The contraction process rapidly closes narrow slot 16. To first approximation ohmic losses in the cylinder are so small that the cylinder behaves as an ideal conductor so that the magnetic flux enclosed within the contracting volume does not change appreciably. In even the first experiments fields of one million gauss were obtained by means of magnetocumulative generators of this type. However these very high fields were, and to date have been, achieved only over very small spatial regions. In prior art magnetocumulative generators of this type, in the region of flux compression, if no flux is lost into the enclosing conductor, then to first order, the magnetic field B and the total magnetic energy of the magnetic field E both increase in proportion to the compression ratio. This is the ratio, in the region of compression, of the initial volume filled by the magnetic field $V_o$ to the final volume filled by the magnetic field V. The average magnetic pressure P increases in proportion to the compression ratio squared. These relationships may be expressed:

$B = B_o(V_o/V)$,
$P = P_o(V_o/V)^2$,
$E = E_o(V_o/V)$, where the subscript zero denotes initial value. Alternatively, a magnetocumulative generator may be regarded as an electrical circuit whose inductance varies under the influence of external forces. Neglecting electrical resistance and other causes of flux loss, the magnetic flux $\phi$ is a constant equal to the product of the prevailing values of the inductance L and the electrical current I producing the field. Again allowing the subscript zero to denote initial value, this may be expressed.

$$\phi = I_o L_o = IL.$$

The energy in the circuit is given by
$E = \frac{1}{2}LI^2 = E_o(L_o/L)$.

The magnetocumulative generator shown in FIG. 1 increases the value of a magnetic field by compressing its associated magnetic flux tube. A perspective view of part of a typical magnetic flux tube 20 such as could be produced by the solenoid winding 14 of FIG. 1 is shown in FIG. 2. Magnetic field lines 22 which lie in the surface of the flux tube are shown. As schematically shown in FIG. 3, known magnetocumulative generators such as that shown in FIG. 1 function by rapidly compressing a flux tube 25 so that the energy density and the pressure of the magnetic field are greatly increased in the region of constriction. Although it would be ideal if the flux tube could be contained within a perfect conductor, in actuality a large amount of magnetic flux is lost during the operation of presently existing magnetocumulative generators. In other words, when a hypothetical perfect conductor compresses a flux tube electrical currents are induced in the surface of the perfect conductor which maintain the total flux within the flux tube at a constant value. But, since conductors are not perfect, some work expended in compressing a flux tube quickly degenerates into heat in the conductor. This causes some induced currents to die away thereby allowing some flux to escape through the conductor surface. This effect is known as resistive diffusion. Because of resistive diffusion and material strength limitations under conditions of high magnetic pressure, it is characteristic of the performance of presently existing magnetocumulative generators that, while they can easily achieve an increase in magnetic energy by the factor ten, they can achieve an increase in magnetic energy by the factor one-hundred only with great difficulty. This fundamental limitation in the amount of magnetic energy which magnetocumulative generators are currently able to produce has seriously limited their efficacy as tools of research. Although magnetocumulative generators are presently being studied at laboratories in the United States and several foreign countries, most of this work is directed toward the achievement of very high magnetic fields in relatively small spatial regions. If magnetocumulative generators were capable of producing appreciably greater quantities of magnetic energy over larger volumes their importance to presently existing fields of research would be increased, and their use could be extended to many applications which are impossible at the present time. One such use would be to supply very high power to cyclic inductive elementary particle accelerators.

SUMMARY OF THE INVENTION

It is therefore an object of the invention to provide an improved magnetocumulative generator capable of achieving increased quantities of magnetic energy over increased spatial volumes.

Another object of the invention is to provide a physically compact improved magnetocumulative generator capable of achieving increased quantities of magnetic energy over increased spatial volumes.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the method and apparatus of this invention may comprise a housing having a housing chamber with a conducting surface within which is established a magnetic field; and explosive means for changing the contour of the housing chamber so that the magnetic field lines of the magnetic field are stretched and lengthened to increase the energy contained in the magnetic field.

Preferably the housing of this invention comprises a coaxial system having a small radius region or stem for accommodating most of the magnetic flux when it is first established within the housing, and also a large radius portion into which the magnetic flux is swept by the explosive contour changing means. Preferably the large radius portion of the coaxial system is pleated to increasingly lengthen the magnetic field lines of the swept magnetic field while keeping the housing physically compact.

The benefits and advantages of the present invention, as embodied and broadly described herein, include, inter alia, method and physically compact apparatus for the production of very large quantities of magnetic energy over large spatial volumes.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1:
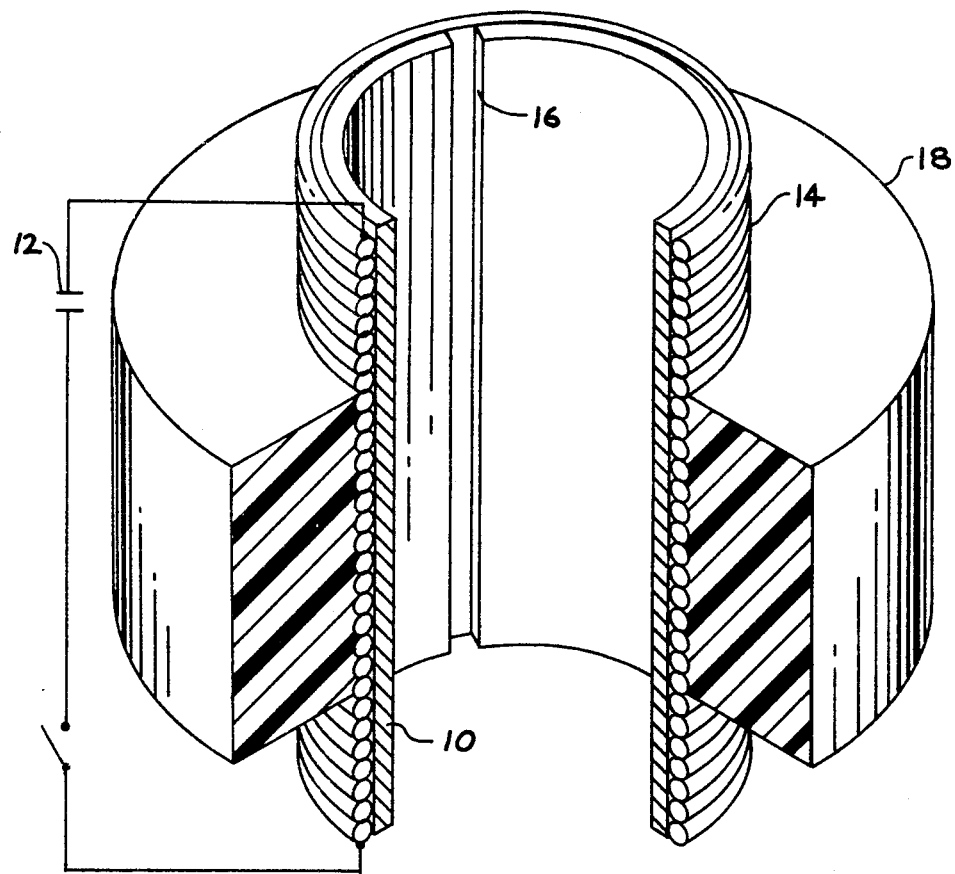
FIG. 1 is a perspective view, partially in cross section, of a typical, prior art magnetocumulative generator.
Figure 2:
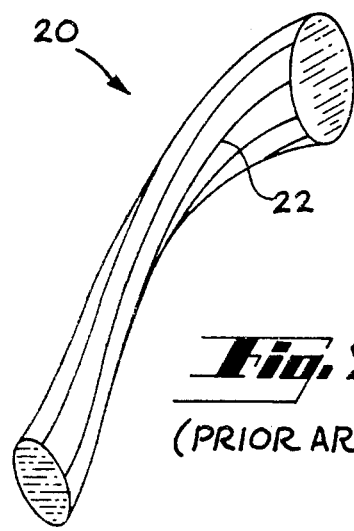
FIG. 2 is a perspective view of part of a typical magnetic flux tube such as could be produced by operation of the magnetocumulative generator of FIG. 1.

Reference will be made in detail to the present preferred embodiment of the invention, an example of which is illustrated in the accompanying drawings. Reference has been made above to FIG. 1, which shows a typical, prior art magnetocumulative generator which increases the energy content of a magnetic field by compressing its associated magnetic flux tube. Reference has also been made above to FIG. 2 which shows a perspective view of part of a typical magnetic flux tube, such as could be produced by operation of the magnetocumulative generator of FIG. 1, and to FIG. 3 which shows a perspective view of part of a magnetic flux tube while under compression by a typical presently known magnetocumulative generator such as that shown in FIG. 1.

Figure 3:
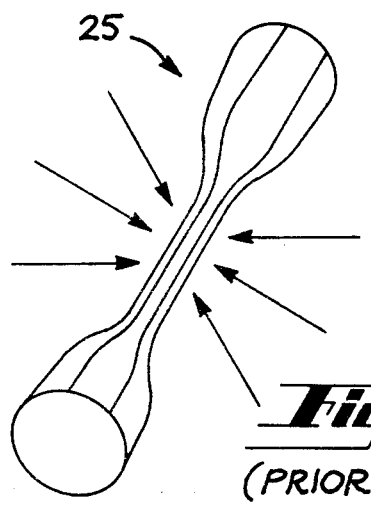
FIG. 3 is a perspective view of part of a typical magnetic flux tube under the influence of external longitudinal forces such as could be produced by the magnetocumulative generator of FIG. 1.
Figures 4A, 4B:
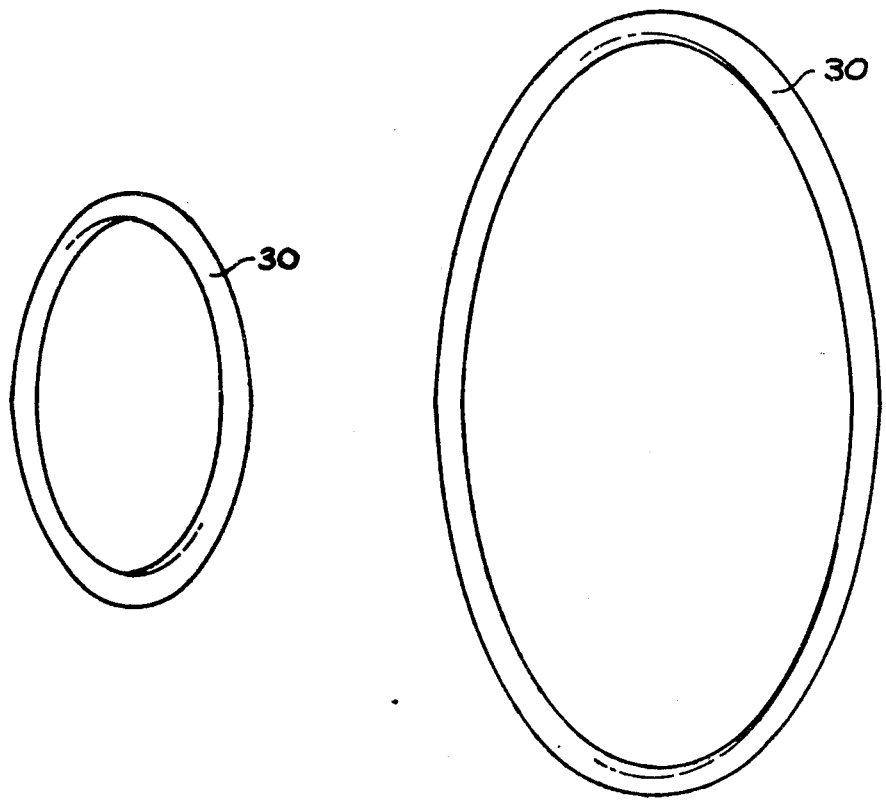
FIG. 4A is a perspective view of a closed magnetic flux tube before flux stretching according to the invention.
FIG. 4B is a perspective view of the closed magnetic flux tube of FIG. 4A after flux stretching according to the invention.

Reference is now made to FIGS. 4A and 4B which are a schematic representation of a configurational change, in accordance with the invention, in flux tube 30 which is quite different from the prior art depicted in FIG. 3, and which results in an increase in both the energy of the magnetic field within the flux tube and the spatial volume over which the magnetic field extends. Flux tube 30 is toroidal, or ring shaped. Flux tubes of this shape are quite common and can be generated by many known means, such as by an electric current flowing in a straight wire. Flux tube 30 is shown to undergo a change in size from the configuration shown in FIG. 4A to a shape having an increased ring diameter, while the cross-sectional area through the flux tube 30 at all locations around the ring is maintained as constant as shown in FIG. 4B. The result of this increase in size, since the quantity of magnetic flux per unit area or the value of the magnetic field at all locations within the flux tube is maintained as approximately constant, is an increase in both the volume of the flux tube and an increase in the energy of the magnetic field within the flux tube. The percent increase in magnetic field energy is approximately equal to the percent increase in volume of the flux tube. For the purpose of explanation of principle, were flux tube 30 contained within a perfect conductor, the surface area of that conductor would have to be increased to accommodate the configurational change. Electric currents would have to be induced in that additional surface to maintain the flux within the flux tube. The energy required to establish these additional currents would be equivalent to the additional magnetic field energy within the flux tube after the configurational change. In other words, it would require work, or force acting over distance, to expand the perfect conductor to produce the configurational change. This work would manifest itself in increased magnetic field energy. If the surrounding conductor were not perfect, resistive diffusion would allow some magnetic flux to escape and result in the loss of some potentially available magnetic field energy.

Therefore, the energy of a magnetic field can be increased either by compressing or forcing the magnetic field lines closer together as known in the prior art and schematically indicated in FIG. 3, or in accordance with the invention by stretching the magnetic field lines to additional length as schematically indicated in FIGS. 4A and 4B. Also, the energy of a magnetic field can be increased by the simultaneous or sequential application of compressing and stretching means to magnetic flux.

Figure 5:
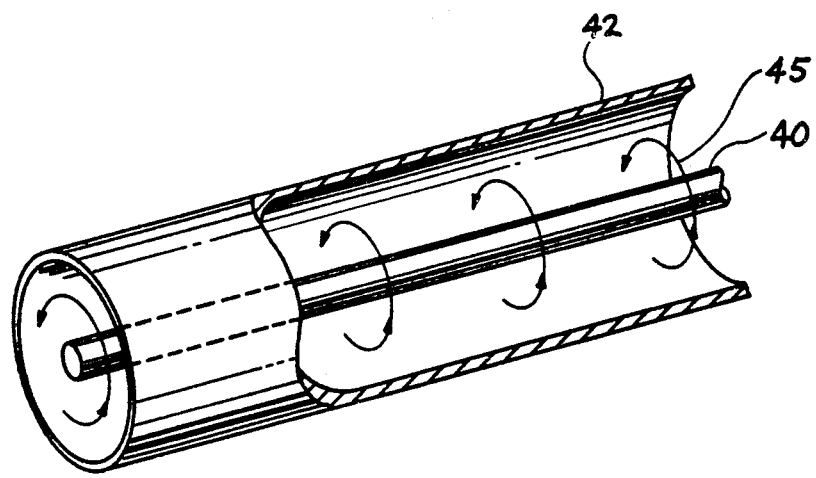
FIG. 5 is a perspective view, partially in cross section, of a part of a prior art coaxial line, showing the magnetic flux in the region between the inner conductor and the outer tubular conductor which is produced by current carried by the coaxial line.

Reference is now made to FIG. 5 which is a perspective view of part of a prior art coaxial line. The coaxial line comprises an inner conductor 40 and an outer tubular conductor 42. Magnetic flux 45 is produced by current carried in the coaxial line. This magnetic flux is in a toroidal or ring configuration and is shown to illustrate the ease with which such flux configurations can be achieved. In coaxial lines of this type, the value of the magnetic field varies inversely as the radius or distance from the center axis of the inner conductor.

Figure 6:
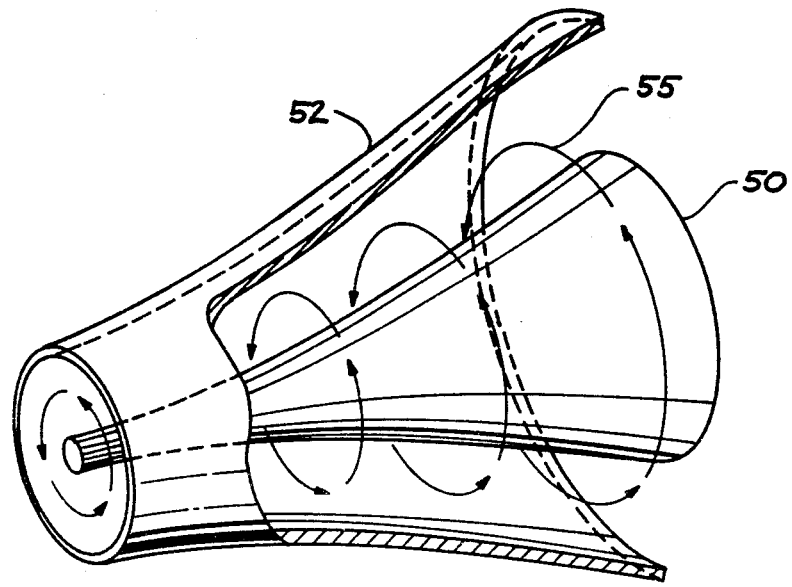
FIG. 6 is a perspective view, partially in cross section, of a part of a variable radius coaxial line in which the radius of the inner conductor, and the inside radius of the outer conductor, are variable, to illustrate concentration of field lines as known in the art.

FIG. 6 is a perspective view of a variable radius coaxial line in which the radius of inner conductor 50 and the inside radius of outer conductor 52 are not constant values. Magnetic flux 55 produced by current carried in the coaxial line is in a toroidal or ring configuration. As the case with the coaxial line of FIG. 5, the magnetic field of the variable radius coaxial line of FIG. 6 varies inversely as the distance from the center axis of the inner conductor. Consequently, most of the magnetic flux contained within the variable radius coaxial line tends to be located in the small radius regions thereof. In situations where the gap between the inner and the outer conductor is fairly uniform, it is generally true that if flux is input into a variable radius coaxial line, or system, most of it will go down into the small radius regions. These small radius regions are sometimes called stems.

Figure 7:
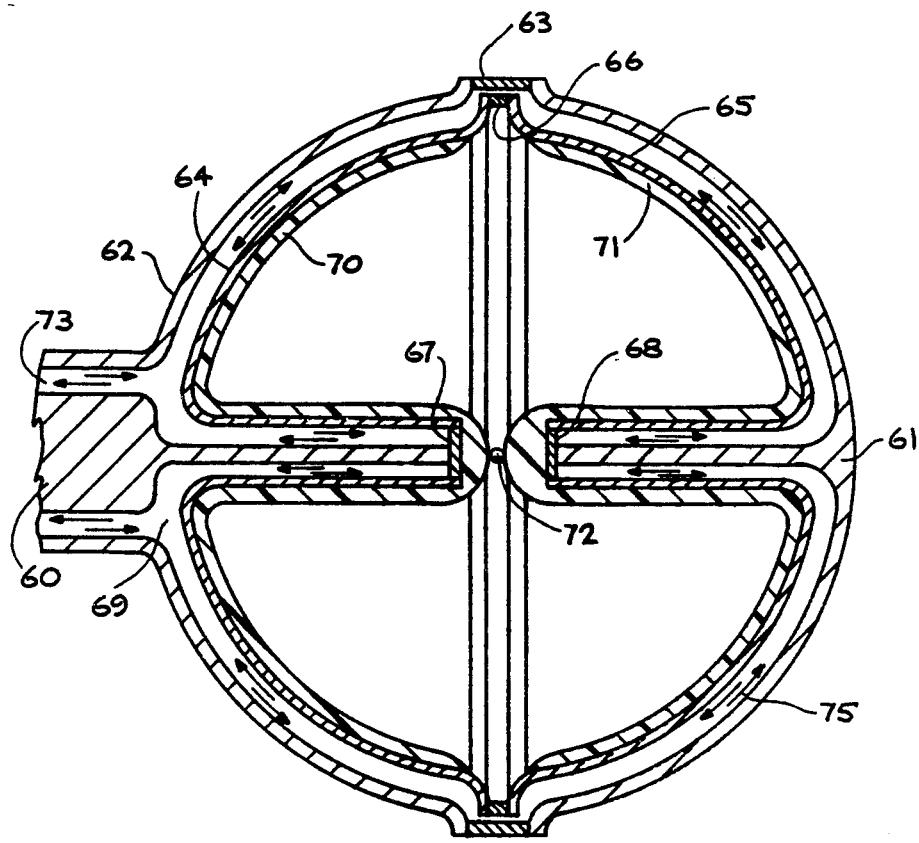
FIG. 7 is a cross sectional side view of a first embodiment of a magnetocumulative generator made in accordance with the invention.

Reference is now made to FIG. 7 which shows a first embodiment of a magnetocumulative generator made in accordance with the invention. Electrical conductors 60, 61, 62, 63, 64, 65, 66, 67 and 68 form a housing, or a coaxial system, defining a housing chamber 69. Chamber 69 has both small and large radius portions. Magnetic flux from any external source, which is not shown, is fed into housing chamber 69 through an input port 73. This can be accomplished by any of many techniques very well known in the prior art such as, for example, by introducing an electrical voltage across conductors 60 and 62 in the location of input port 73 by means of a pulse power generator as described in U.S. Pat. No. 3,356,869 to Hilton and Morley. The direction of the electric surface current produced by this voltage, in the electrically conducting surface of chamber 69, is indicated by arrows 75. This direction can be reversed by changing the polarity of the electrical voltage. For reasons pointed out hereinabove, most of the input flux migrates down into the small radius regions or stems of the chamber. These stems are located near the center axis of FIG. 7. The housing is equipped with high-explosive layers 70 and 71 composed of any high-explosive such as, for example, HMX. After the introduction of the input flux, explosive layers 70 and 71 are detonated by detonator 72. The propagation of the detonation through explosive layers 70 and 71 causes a phased closure of housing chamber 69 which starts at the ends of the stems nearest detonator 72, sweeps along the stems, and proceeds up to large radius thereby sweeping the input flux up to the vicinity of electrical conductor 63 for utilization. Thus most of the input flux is stretched from small to large radius and additionally is compressed into a small cross-sectional area. This greatly energy enhances the magnetic field. The explosion can be tamped and the explosive products captured and contained by electrical conductors 61 and 62 functioning as structural members. It is believed on the basis of well known prior art hydrodynamic considerations that the flux stretching accomplished by this apparatus will be most efficient when the pressure in the swept magnetic field is an appreciable fraction, for example approximately ten to thirty percent, of the high-explosive driving pressure.

Figure 8:
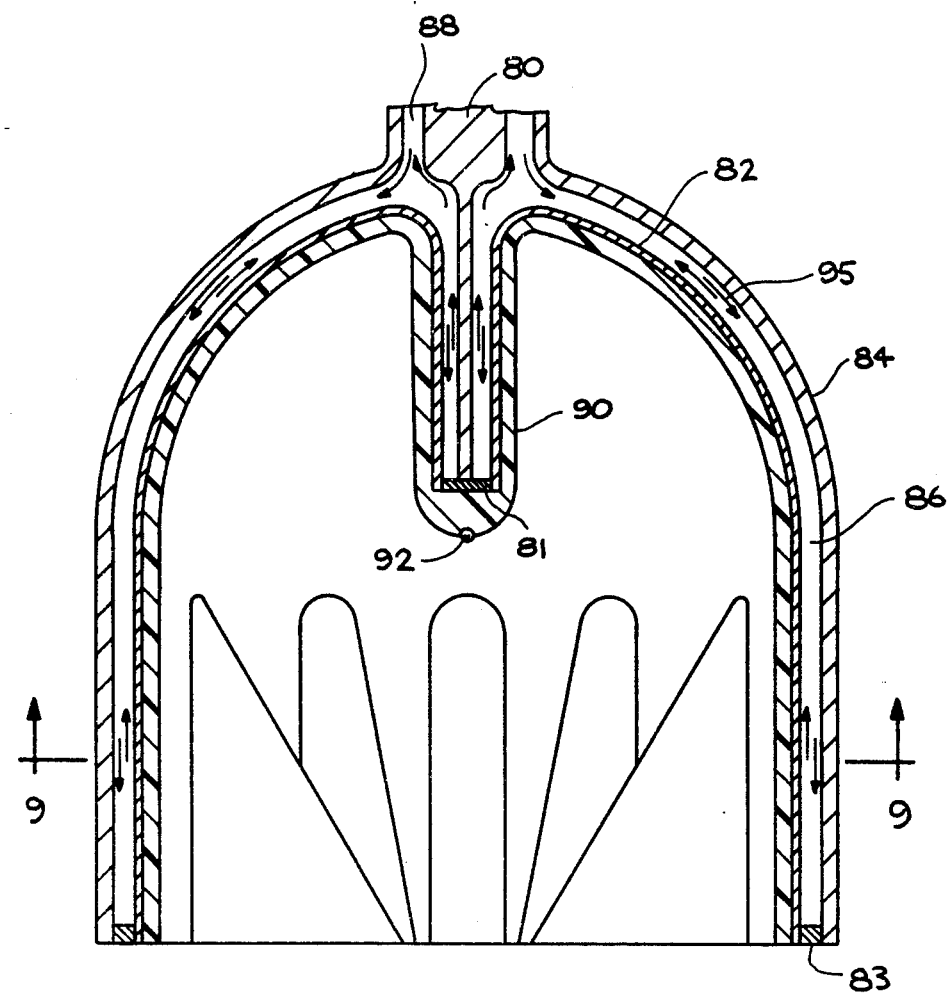
FIG. 8 is a cross sectional side view of a second embodiment of a magnetocumulative generator made in accordance with the invention.
Figure 9:
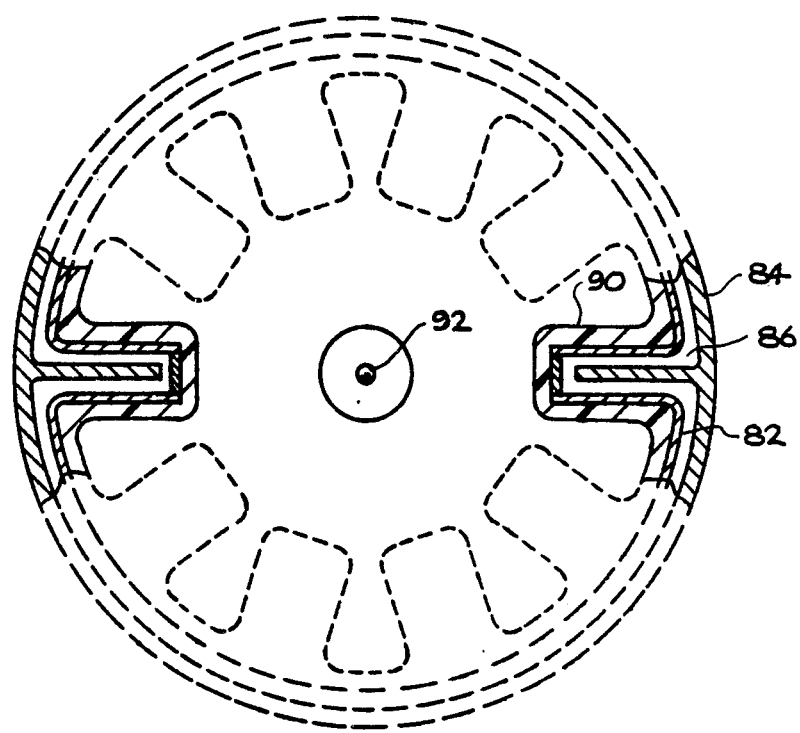
FIG. 9 is a cross sectional view of the second embodiment of a magnetocumulative generator of FIG. 8, taken generally along line 9—9 in FIG. 8.

A second embodiment of a magnetocumulative generator made in accordance with the invention is shown in FIGS. 8 and 9. The view given in FIG. 9 is taken generally along line 9—9 in FIG. 8. Electrical conductors 80, 81, 82, 83 and 84 form a housing, or coaxial system, defining a housing chamber 86 having both small and large radius portions. Chamber 86 has an electrically conducting surface. Magnetic flux from any external source, which is not shown, is fed into housing chamber 86 through input port 88. This can be accomplished by any of many techniques very well known in the prior art such as, for example, by introducing an electrical voltage across conductors 80 and 84 in the location of input port 88 by means of a pulse power generator as described in U.S. Pat. No. 3,356,869 to Hilton and Morley. The direction of the electric surface current produced by this voltage, in the surface of chamber 86, is indicated by arrows 95. This direction can be reversed by changing the polarity of the electrical voltage. Since the magnetic field within housing chamber 86 varies inversely as the distance from the center axis of conductor 80, most of the input flux positions itself in the small radius region or stem of the chamber near the center axis of the apparatus. High-explosive layer 90 composed of any high-explosive such as, for example, HMX is positioned adjacent to electrical conductor 82. After the input flux is injected into the apparatus, explosive layer 90 is detonated by detonator 92. Detonation propagation through explosive layer 90 causes a phased closure of housing chamber 86 starting at the end of the stem nearest detonator 92, sweeping along the stem and up to large radius, and proceeding into the pleated or folded portion of the apparatus for utilization. This phased closure greatly increases the energy content of the input magnetic field by very appreciably stretching and compressing the flux while sweeping it toward electrical conductor 83. The structural properties of conductor 84 can be used to tamp the explosion and contain the explosive products thereof. As with the apparatus shown in FIG. 7, it is believed on the basis of well known prior art hydrodynamic considerations that operation is most efficient when the pressure in the magnetic field being swept by the collapsing conductors is at an appreciable fraction, for example approximately ten to thirty percent, of the explosive driving pressure.

Figure 10:
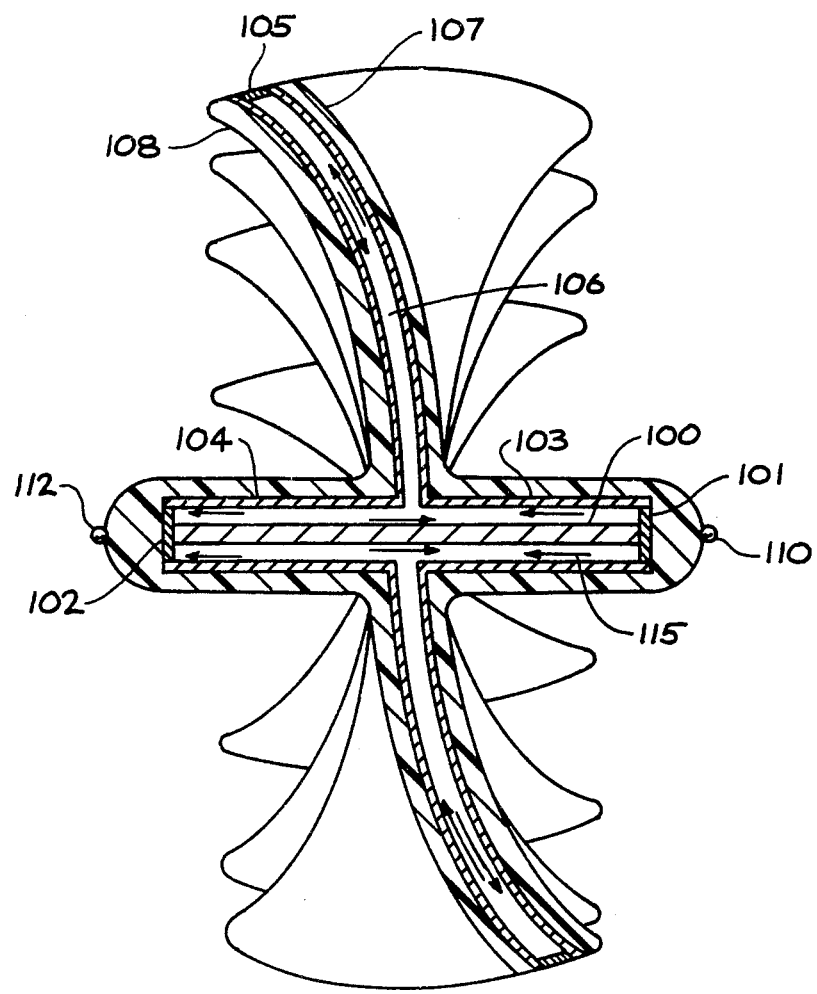
FIG. 10 is a cross sectional side view of a third embodiment of a magnetocumulative generator made in accordance with the invention.
Figure 11:
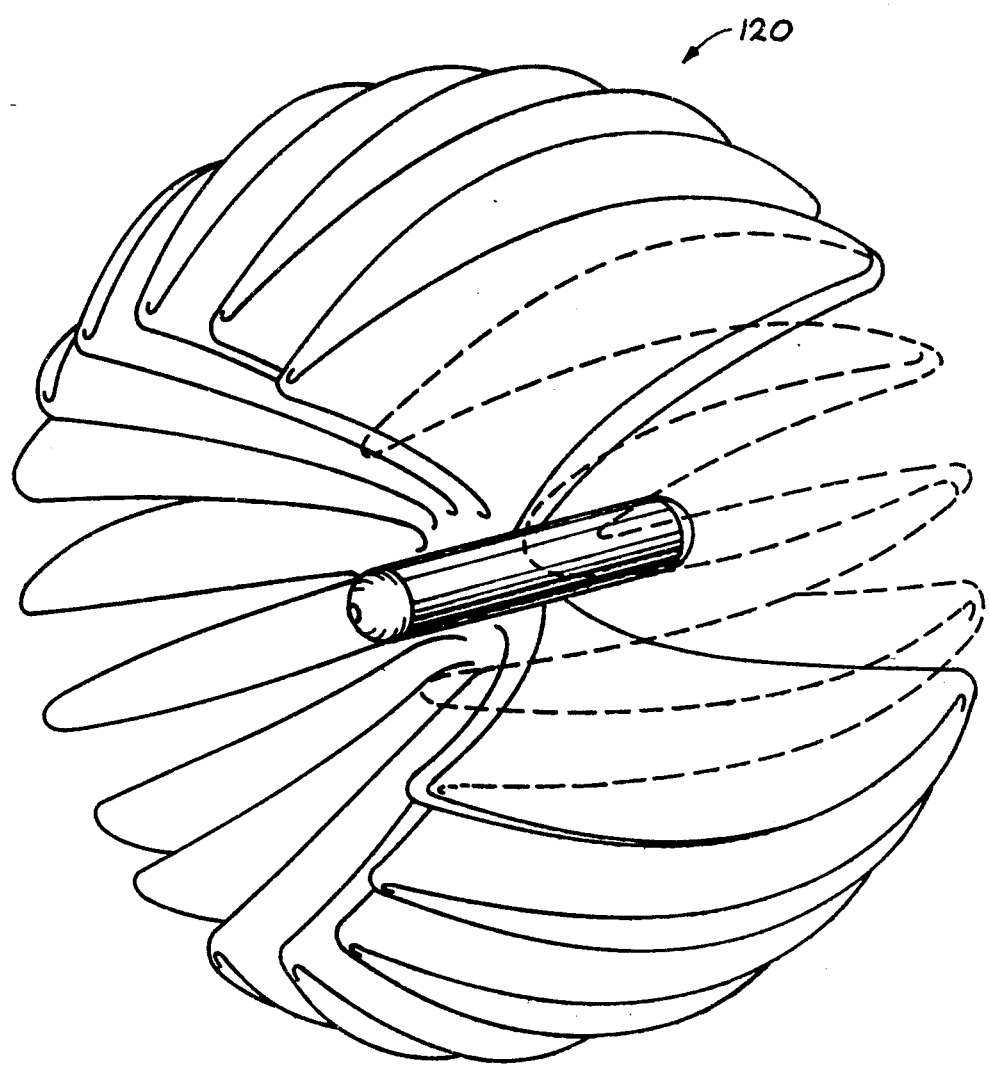
FIG. 11 is a perspective view of the third embodiment of a magnetocumulative generator of FIG. 10.

A third embodiment of a magnetocumulative generator made in accordance with the invention is shown in cross-sectional side view in FIG. 10. The apparatus 120 is shown in perspective view in FIG. 11. Electrical conductors 100, 101, 102, 103, 104 and 105 form a housing, or coaxial system, defining a housing chamber 106 having both small and large radius portions. Chamber 106 has an electrically conducting surface. Magnetic flux from any external source, which is not shown, is fed into housing chamber 106 by any means, which also is not shown. This may be accomplished by means analogous to those discussed with respect to the first two embodiments of this invention which are very well known in the prior art. A typical directional path of the electric surface current, supporting the magnetic flux, in the surface of chamber 106, is indicated by arrows 115. An electric surface current flowing in the opposite direction would support a similar magnetic flux oppositely directed. For reasons explained above, most of the input flux positions itself in the small radius regions or stems of the chamber near the center axis of the apparatus. High-explosive layers 107 and 108 composed of any high-explosive such as, for example, HMX are disposed adjacent to the housing. After the input flux has been injected into the apparatus explosive layers 107 and 108 are approximately simultaneously detonated by detonators 110 and 112, respectively. The propagation of the detonations through the explosive layers causes a phased closure of housing chamber 106. The input magnetic flux is thereby swept along the small radius stems toward the center of the apparatus and thence radially outward into the polar directed pleated section and toward electrical conductor 105 for utilization. In this way the energy content of the input magnetic field is greatly increased by both flux stretching and flux compression. It is believed on the basis of well known prior art hydrodynamic considerations that operation of this apparatus is most efficient when the pressure in the magnetic field being swept by the collapsing conductors is at an appreciable fraction, for example approximately ten to thirty percent, of the explosive driving pressure.

The three embodiments of the invention shown in FIGS. 7 to 11 are improved magnetocumulative generators capable of achieving extremely high magnetic fields over large spatial volumes. In each embodiment the enhanced magnetic field must be utilized within the housing chamber itself. Such fields can be used for many purposes, such as for experimental investigations concerning the structure of matter or to accelerate elementary particles, among others. Additionally, such fields can be used with apparatus as disclosed in our United States patent application Ser. No. 271,721, filed concurrently herewith on June 8, 1981, and titled "METHOD AND APPARATUS FOR THE CONVERSION OF NEUTRON KINETIC ENERGY INTO BENEFICIAL AND USEFUL FORMS". The fields are attained, to a major degree, by stretching and lengthening magnetic field lines to increase the energy content thereof.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for increasing the energy of a magnetic field, which comprises:
   a housing having an electrically conducting surface defining a housing chamber within which said magnetic field is disposed; and
   explosive means for changing the contour of said housing chamber so that the energy contained in said magnetic field is increased substantially by stretching the magnetic field lines of said magnetic field to additional length within the housing chamber.

2. Apparatus, as recited in claim 1, wherein said housing comprises a coaxial system so that the value of said magnetic field disposed within said housing chamber varies approximately inversely as the distance from the center axis of said coaxial system, and the magnetic field lines of said magnetic field are closed and encirclingly surround said center axis.

3. Apparatus, as recited in claim 2, wherein said explosive contour changing means comprises an explosive layer adjacent to said coaxial system, and detonation means for detonating said explosive layer so that the propagation of the detonation through said explosive layer causes a phased closure of said housing chamber so that said magnetic field lines of said magnetic field are lengthened so that the energy contained in said magnetic field is increased.

4. Apparatus for increasing the energy of a magnetic field, which comprises:
   a housing having an electrically conducting surface defining a housing chamber within which said magnetic field is disposed, wherein said housing comprises a pleated coaxial system so that said housing chamber varies in extent with polar angle as taken from the center axis of said coaxial system, and the magnetic field lines of said magnetic field are closed and surround said center axis; and
   explosive means for changing the contour of said housing chamber so that the magnetic field lines of said magnetic field are lengthened within the housing chamber so that the energy contained in said magnetic field is increased, wherein said contour changing means comprises an explosive layer adjacent to said pleated coaxial system, and detonation means for detonating said explosive layer so that the propagation of the detonation through said explosive layer causes a phased closure of said housing chamber so that the magnetic field lines of said magnetic field are lengthed so that the energy contained in said magnetic field is increased and so that said magnetic field lines of said magnetic field are pleatedly folded to occupy a smaller areal region than they would were they of circular extent.

5. Apparatus for increasing the energy of a magnetic field, which comprises:
   a system comprising a conducting surface defining a housing chamber within which said magnetic field is disposed with closed magnetic field lines;
   an explosive layer adjacent to said system; and
   detonation means for detonating said explosive layer so that the propagation of the detonation through said explosive layer causes a phased closure of said housing chamber so that the energy contained in said magnetic field is increased substantially by stretching the magnetic field lines of said magnetic field to additional length within the housing chamber, and also by compressing or forcing the magnetic field lines of said magnetic field closer together within the housing chamber so that said magnetic field lines of said magnetic field are positioned to occupy a smaller areal region that they would were they approximately circularly extended.

6. Method for increasing the energy of a magnetic field, comprising the steps of:
   providing a housing having an electrically conducting surface defining a housing chamber within which said magnetic field is disposed; and
   explosively changing the contour of said housing chamber so that the energy contained in said magnetic field is increased substantially by stretching the magnetic field lines of said magnetic field to additional length within the housing chamber.

7. Method, as recited in claim 6, wherein said housing provided in said providing step comprises a coaxial system so that the value of said magnetic field disposed within said housing chamber varies approximately inversely as the distance from the center axis of said coaxial system, and the magnetic field lines of said magnetic field are closed and encirclingly surround said center axis.

8. Method, as recited in claim 7, wherein said contour changing step comprises the steps of positioning an explosive layer adjacent to said coaxial system, and detonating said explosive layer so that the propagation of the detonation through said explosive layer causes a phased closure of said housing chamber so that said magnetic field lines of said magnetic field are lengthened so that the energy contained in said magnetic field is increased.

9. Method for increasing the energy of a magnetic field, comprising the steps of:
   providing a housing having an electrically conducting surface defining a housing chamber within which said magnetic field is disposed, wherein said housing comprises a pleated coaxial system so that said housing chamber varies in extent with polar angle as taken from the center axis of said coaxial system, and the magnetic field lines of said magnetic field are closed and surround said center axis; and
   explosively changing the contour of said housing chamber so that the magnetic field lines of said magnetic field are lengthened within the housing chamber so that the energy contained in said magnetic field is increased, wherein said contour is changed by steps comprising positioning an explosive layer adjacent to said pleated coaxial system, detonating said explosive layer so that the propagation of the detonation through said explosive layer causes a phased closure of said housing chamber so that the magnetic field lines of said magnetic field are lengthened so that the energy contained in said magnetic field is increased and so that said magnetic field lines of said magnetic field are pleatedly folded to occupy a smaller areal region than they would were they of circular extent.

10. Method for increasing the energy of a magnetic field, comprising the steps of:
    providing a system comprising a conducting surface defining a housing chamber within which said magnetic field is disposed with closed magnetic field lines;
    supplying an explosive layer adjacent to said system; and
    detonating said explosive layer so that the propagation of the detonation through said explosive layer causes a phased closure of said housing chamber so that the energy contained in said magnetic field is increased substantially by stretching the magnetic field lines of said magnetic field to additional length within the housing chamber, and also by compressing or forcing the magnetic field lines of said magnetic field closer together within the housing chamber so that said magnetic field lines of said magnetic field are positioned to occupy a smaller areal region than they would were they approximately circularly extended.

* * * * *